119,144

UNITED STATES PATENT OFFICE.

JOHN W. HELMS, OF BAINBRIDGE, GEORGIA.

IMPROVEMENT IN MEDICAL COMPOUNDS OR LINIMENTS FOR RHEUMATISM, &c.

Specification forming part of Letters Patent No. 119,144, dated September 19, 1871.

*To all whom it may concern:*

Be it known that I, JOHN W. HELMS, of Bainbridge, in the county of Decatur and State of Georgia, have invented a new and useful Improvement in Liniment; and I do hereby declare that the following is a full, clear, and exact description thereof, which will enable others skilled in the art to make and use the same.

My invention has for its object to furnish an improved liniment for rheumatism, neuralgia, toothache, sprains, bruises, paralysis, &c.; and it consists of the liniment prepared of the ingredients in the proportions hereinafter set forth.

In preparing this liniment, I mix with each other one gallon of lubricating oil, one-half gallon of kerosene oil, sixteen fluid ounces of spirits of turpentine, sixteen fluid ounces of sweet spirits of nitre, sixteen fluid ounces of spirits of camphor, thirty-two fluid ounces of aqua ammonia, and twelve fluid ounces of laudanum.

Having thus described my invention, I claim as new and desire to secure by Letters Patent—

A liniment prepared of the ingredients in about the proportions herein set forth.

JOHN W. HELMS.

Witnesses:
    JAMES A. CLARK,
    I. A. COE.